(12) United States Patent
Zhou et al.

(10) Patent No.: US 12,091,340 B2
(45) Date of Patent: Sep. 17, 2024

(54) GRAPHENE-MAGNETITE CONDUCTIVE SKELETON ELECTRODE, PREPARATION METHOD AND APPLICATION THEREOF, AND METHOD FOR TREATING PETROCHEMICAL WASTEWATER

(71) Applicant: Nankai University, Tianjin (CN)

(72) Inventors: Qixing Zhou, Tianjin (CN); Ruixiang Li, Tianjin (CN); Tian Li, Tianjin (CN); Xiaolin Zhang, Tianjin (CN)

(73) Assignee: Nankai University, Tianjin (CN)

( * ) Notice: Subject to any disclaimer, the term of this patent is extended or adjusted under 35 U.S.C. 154(b) by 456 days.

(21) Appl. No.: 17/473,457

(22) Filed: Sep. 13, 2021

(65) Prior Publication Data
US 2023/0022680 A1    Jan. 26, 2023

(30) Foreign Application Priority Data

Jul. 14, 2021 (CN) .......................... 202110796665.8

(51) Int. Cl.
C09D 7/62 (2018.01)
C02F 3/00 (2023.01)
(Continued)

(52) U.S. Cl.
CPC ............ C02F 3/005 (2013.01); C09C 1/0081 (2013.01); C09D 5/24 (2013.01); C09D 7/62 (2018.01);
(Continued)

(58) Field of Classification Search
CPC .... C02F 3/005; C02F 2103/365; C02F 3/344; C02F 3/348; C02F 2001/46138;
(Continued)

(56) References Cited

U.S. PATENT DOCUMENTS

2011/0275878 A1* 11/2011 Meckenstock .......... B09C 1/002
252/186.1
2016/0137533 A1* 5/2016 Na ........................ C23C 16/448
205/759
(Continued)

FOREIGN PATENT DOCUMENTS

CN     111463440 B  *  2/2022 ............. B82Y 40/00

OTHER PUBLICATIONS

Krumm, A. "Measure microbial growth using the OD600", https://www.bmglabtech.com/en/blog/measure-microbial-growth-using-the-od600/ Oct. 11, 2019 (Year: 2019).*

Primary Examiner — Mark Kopec
Assistant Examiner — Jaison P Thomas
(74) Attorney, Agent, or Firm — Marcus C. Dawes

(57) ABSTRACT

The present disclosure relates to the technical field of microbial electrochemical technology, in particular to a graphene-magnetite conductive skeleton electrode, a preparation method and application thereof, and a method for treating petrochemical wastewater. In the present disclosure, the surface roughness of the graphite rod electrode can be increased by the conductive skeleton modified on the surface of the graphite rod electrode, which is beneficial to the enrichment of microorganisms. The increase in the load of microorganisms will mean the amount of electroactive microorganisms will also increase, which will further improve the electron transfer ability, and because the material of the modified layer is a conductive material, it is also more conducive to the transfer of electrons; at the same time, the conductive skeleton modified on the surface of graphite rod electrode can also further enhance the transmission distance of electrons because of the skeleton constructed.

9 Claims, 2 Drawing Sheets

(51) Int. Cl.
*C09C 1/00* (2006.01)
*C09D 5/24* (2006.01)
*C09D 127/22* (2006.01)
*C02F 103/36* (2006.01)

(52) U.S. Cl.
CPC ........ *C09D 127/22* (2013.01); *C01P 2006/40* (2013.01); *C02F 2103/365* (2013.01)

(58) Field of Classification Search
CPC .................. C02F 3/346; C02F 2101/32; C02F 2201/46135; C02F 1/46109; C02F 2001/46133; C09C 1/0081; C09D 5/24; C09D 7/62; C09D 127/22; C09D 127/18; C01P 2006/40; C01B 32/19; C08F 214/262; C08K 3/042; C08K 2003/0856
See application file for complete search history.

(56) References Cited

U.S. PATENT DOCUMENTS

2022/0306501 A1* 9/2022 Cahan .................. C25B 11/095
2023/0322596 A1* 10/2023 Brockmeyer ....... C02F 1/46114
 210/605

* cited by examiner

GRAPHENE-MAGNETITE CONDUCTIVE SKELETON ELECTRODE, PREPARATION METHOD AND APPLICATION THEREOF, AND METHOD FOR TREATING PETROCHEMICAL WASTEWATER

CROSS REFERENCE TO RELATED APPLICATION

This patent application claims the benefit and priority of Chinese Patent Application No. 202110796665.8, filed on Jul. 14, 2021, the disclosure of which is incorporated by reference herein in its entirety as part of the present application.

TECHNICAL FIELD

The present disclosure relates to the technical field of microbial electrochemical technology, in particular to a graphene-magnetite conductive skeleton electrode, a preparation method and application thereof, and a method for treating petrochemical wastewater.

BACKGROUND ART

Petroleum is known as the "the blood of industry", and petrochemical products have been widely used in all aspects of economic construction. However, due to the limitations of the petrochemical industry and treatment technology, a large amount of waste water from the petrochemical industry is inevitably discharged into environment. The petrochemical wastewater is characterized by high organic content, complex composition, high odor, and difficult to handle. In addition, the aromatic components in the wastewater are more toxic and have "three characteristics" of mutagenesis, carcinogenesis and teratogenesis. The petrochemical wastewater discharged without treatment will not only cause serious impacts on the ecological environment, but also result in serious harm to the human body. With the proposal of the "Pollution Prevention and Control Battle", the remediation of petrochemical wastewater has become a focus of research in many countries.

Physical and chemical treatment methods such as adsorption, volatilization, flocculation, reverse osmosis, photolysis, advanced oxidation processes and chemical degradation, have been widely used to treat petrochemical wastewater. Although these conventional treatment methods have certain advantages, they have the problems of high cost, complicated operation, and even secondary pollution. Therefore, more green and efficient degradation methods are required for water treatment. The microbiological methods have the characteristics of low cost and no secondary pollution, but in traditional use, it has the disadvantages of low effective concentration of degrading bacteria, easy loss of bacteria, and poor anti-pollution ability. Microbial electrochemical technology (MET), as a promising wastewater remediation technology, has the advantages of complete pollutant degradation, no secondary pollution, and simple operation. In MET, the electroactive microorganisms enriched in the anode can oxidize and decompose pollutants to generate electrons. The electrons are used for their own proliferation, and the rest is transferred to the terminal electron acceptor through extracellular electron transfer and an external circuit, thus achieving the conversion of biochemical energy to electrical energy while degrading pollutants. Compared with aerobic wastewater treatment, MET produces less sludge and consumes less energy.

Although MET has great potential for simultaneous petrochemical wastewater treatment and energy recovery. However, the low bacterial load on the electrode in the system and the low electron transfer efficiency between electroactive microorganisms and the electrode limit the practical application.

SUMMARY

The purpose of the present disclosure is to provide a graphene-magnetite conductive skeleton electrode, a preparation method and application thereof, and a method for treating petrochemical wastewater. The graphene-magnetite conductive skeleton prepared by the preparation method can increase the load of microorganisms and improve the electron transfer efficiency between electroactive microorganisms and electrodes.

In order to achieve the above purpose of the disclosure, the present disclosure provides the following technical schemes:

The present disclosure provides a method for preparing a graphene-magnetite conductive skeleton electrode, comprising the following steps:

Mixing a soluble iron salt solution with a pH value of 6.5-7.5, a culture medium, and graphene, introducing nitrogen, then adding the *Geobacter sulfurreducens* to perform a reduction reaction of the soluble iron salt and centrifuging to obtain graphene-magnetite-*Geobacter sulfurreducens*;

Mixing the graphene-magnetite-*Geobacter sulfurreducens* and a Nafion, and then coating the resulting suspension on the surface of a graphite rod electrode to obtain the graphene-magnetite conductive skeleton electrode.

Preferably, the preparation process of the graphene includes: using a graphite sheet as a working electrode and a platinum sheet as a counter electrode, and electrolyzing in an electrolyte to obtain the graphene;

The raw materials for preparing the electrolyte include 100 mL of water, 1.2-1.5 mL of concentrated sulfuric acid, and 0.5-1.5 mL of a KOH solution;

The mass concentration of the concentrated sulfuric acid is 98%; and the mass concentration of the KOH solution is 30%.

Preferably, the electrolysis process is as follows: applying a voltage of +2.5 V for 1-3 min, the voltage of +10 V for 5-10 min, the voltage of −10 V for 3-5 min, and the voltage of +10 V for 10-15 min using a DC power supply in sequence.

Preferably, the concentration of the soluble iron salt in the soluble iron salt solution is 20-100 mmol/L.

Preferably, the culture medium includes 10 mL of a vitamin solution, 10 mL of a metal solution, 2.5 g of $NaHCO_3$, 0.53 g of $NaH_2PO_4$, 0.25 g of $NH_4Cl$, 0.1 g of KCl and 1 g of sodium acetate:

The vitamin solution includes 0.2 g/L biotin, 1 g/L vitamin B6, 0.5 g/L vitamin B1, 0.5 g/L pantothenic acid, 0.5 g/L para-aminobenzoic acid, 0.2 g/L folic acid, 0.5 g/L riboflavin, 0.5 g/L niacin, 0.01 g/L vitamin B12 and 0.5 g/L lipoic acid:

The metal solution includes 1.5 g/L nitrilotriacetic acid, 0.5 g/L $MnSO_4 \cdot H_2O$, 0.1 g/L $FeSO_4 \cdot 7H_2O$, 0.1 g/L $CoCl_2 \cdot 6H_2O$, 0.01 g/L $CuSO_4 \cdot 5H_2O$, 0.01 g/L $H_3BO_3$, 0.024 g/L $NiCl_2 \cdot 6H_2O$, 3 g/L $MgSO_4$, 1 g/L NaCl, 0.1 g/L $CaCl_2 \cdot 2H_2O$, 0.13 g/L $ZnCl_2$, 0.01 g/L $KAl(SO_4)_2 \cdot 12H_2O$, 0.025 g/L $Na_2MoO_4$ and 0.025 g/L $Na_2WO_4 \cdot 2H_2O$.

Preferably, the dosage ratio of the soluble iron salt solution, culture medium and graphene is 1 L:20 mL:(0.75-1.25) g.

Preferably, the OD600 of the reduction reaction solution obtained after adding the *Geobacter sulfurreducens* is 0.15-0.25.

The present disclosure also provides a graphene-magnetite conductive skeleton electrode prepared by the preparation method described in the above technical scheme, including a graphite rod electrode and a modified layer coated on the surface of the graphite rod electrode;

The modified layer includes graphene, magnetite, and *Geobacter sulfurreducens*.

The present disclosure also provides the application of the graphene-magnetite conductive skeleton electrode described in the above technical scheme in the treatment of petrochemical wastewater.

The present disclosure also provides a method for treating petrochemical wastewater, comprising the following steps:

Subjecting a three-electrode system to enrichment culture of a degradable microbial membrane in a mixed solution of a suspension containing electroactive microorganisms and a phosphate buffer to obtain the degradable microbial membrane on the surface of a graphene-magnetite conductive skeleton electrode; the mixed solution of the suspension containing electroactive microorganisms and the phosphate buffer also includes a carbon source; the three-electrode system uses the graphene-magnetite conductive skeleton electrode of claim 8 as a working electrode, a platinum sheet as a counter electrode, and Ag/AgCl as a reference electrode;

According to the above method, replacing the mixed solution of the suspension containing the electroactive microorganisms and the phosphate buffer with the petrochemical wastewater to be treated, and performing degradation to obtain the degraded petrochemical wastewater.

The present disclosure provides a method for preparing a graphene-magnetite conductive skeleton electrode, comprising the following steps: mixing a soluble iron salt solution with a pH value of 6.5-7.5, a culture medium, and graphene, introducing nitrogen, then adding the *Geobacter sulfurreducens* to perform a reduction reaction of the soluble iron salt and centrifuging to obtain the graphene-magnetite-*Geobacter sulfurreducens*; mixing the graphene-magnetite-*Geobacter sulfurreducens* and a Nafion, and then coating the resulting suspension on the surface of a graphite rod electrode to obtain the graphene-magnetite conductive skeleton electrode. In the present disclosure, the surface roughness of the graphite rod electrode can be increased by the conductive skeleton modified on the surface of the graphite rod electrode, which is beneficial to the subsequent enrichment of microorganisms in the process of treating petrochemical wastewater. The increase in the load of microorganisms will mean the amount of electroactive microorganisms will also increase, which will further improve the electron transfer ability, and because the material of the modified layer is a conductive material, it is also more conducive to the transfer of electrons; at the same time, the conductive skeleton modified on the surface of graphite rod electrode can also further enhance the transmission distance of electrons because of the skeleton constructed.

DETAILED DESCRIPTION OF THE EMBODIMENTS

Figure 1:
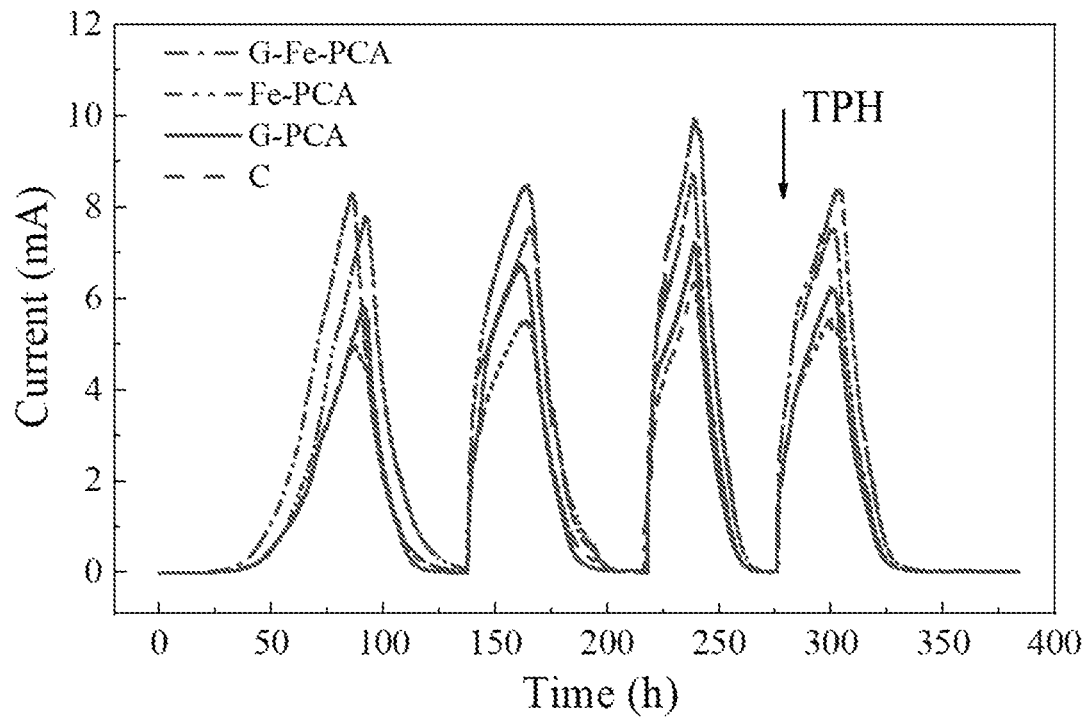
FIG. 1 shows the current change curve of Example 1 and Comparative Examples 1-3 during the enrichment culture of the degradable microbial membrane.

The present disclosure provides a method for preparing a graphene-magnetite conductive skeleton electrode, comprising the following steps:

Mixing a soluble iron salt solution with a pH value of 6.5-7.5, a culture medium, and graphene, introducing nitrogen, then adding the *Geobacter sulfurreducens* to perform a reduction reaction of the soluble iron salt and centrifuging to obtain graphene-magnetite-*Geobacter sulfurreducens*;

Mixing the graphene-magnetite-*Geobacter sulfurreducens* and a Nafion, and then coating the resulting suspension on the surface of a graphite rod electrode to obtain the graphene-magnetite conductive skeleton electrode.

In the present disclosure, unless otherwise specified, all the preparation materials are commercially available products well known to those skilled in the art.

In the present disclosure, a soluble iron salt solution with a pH value of 6.5-7.5, a culture medium, and graphene are mixed, after introducing nitrogen, the *Geobacter sulfurreducens* is added to perform a reduction reaction of the soluble iron salt, and the resulting system is centrifuged to obtain graphene-magnetite-*Geobacter sulfurreducens*.

In the present disclosure, the graphene is preferably obtained by preparation, and the preparation method of the graphene preferably includes: using a graphite sheet as a working electrode and a platinum sheet as a counter electrode, and electrolyzing in an electrolyte to obtain the graphene.

The present disclosure does not have any special limitations on the graphite sheets and platinum sheets, a commercially available product well known to those skilled in the art can be used.

In the present disclosure, the raw materials for preparing the electrolyte preferably include 100 mL of water, 1.2-1.5 mL of concentrated sulfuric acid and 0.5-1.5 mL of KOH solution, and more preferably include 100 mL of water, 1.3-1.4 mL of concentrated sulfuric acid and 0.8-1.2 mL of KOH solution. In the present disclosure, the mass concentration of the concentrated sulfuric acid is preferably 98%; and the mass concentration of the KOH solution is preferably 30%.

In the present disclosure, the electrolysis process is preferably as follows: applying a voltage of +2.5 V for 1-3 min, the voltage of +10 V for 5-10 min, the voltage of −10 V for 3-5 min, and the voltage of +10 V for 10-15 min using a DC power supply in sequence; more preferably, applying the voltage of +2.5 V for 2 min, the voltage of +10 V for 6-8 min, the voltage of −10V for 4 min, and the voltage of +10 V for 12-13 min using a DC power supply in sequence.

In the present disclosure, the effect of applying the voltage of +2.5 V in sequence is to wet the sample and insert $SO_4^{2-}$ ions into the grain boundaries of graphite, and the effect of applying the voltage of +10 V is to peel off the graphite sheet, the effect of applying the voltage of −10 V is to reduce the generation of graphene functional groups that are peeled off, and the effect of applying the voltage of +10 V is to further peel off the graphene sheet.

After the electrolysis is completed, the present disclosure preferably also includes centrifugation, washing and drying in sequence; in the present disclosure, the rotation speed of the centrifugation is preferably 10000-12000 rpm, more preferably 10500-11500 rpm, and most preferably 11000 rpm. The time of the centrifugation is preferably 10-15 min, more preferably 11-14 min, and most preferably 12-13 min.

In the present disclosure, the detergent used in the washing is preferably distilled water, and the washing method is preferably centrifugation; the present disclosure does not have any special restrictions on the washing process, and a process well known to those skilled in the art can be used. In the present disclosure, the number of washing is preferably 3-5 times.

In the present disclosure, the drying method is preferably oven drying; the present disclosure does not have any special restrictions on the oven drying process, and a process well known to those skilled in the art can be used.

The present disclosure does not have any special restrictions on the type of soluble iron salt in the soluble iron salt solution, and a type well known to those skilled in the art can be used. In a specific embodiment of the present disclosure, the soluble iron salt is specifically ferric chloride.

In the present disclosure, the concentration of the soluble iron salt solution is preferably 20-100 mmol/L, more preferably 30-80 mmol/L, and more preferably 50-60 mmol/L. In the present disclosure, the pH value of the soluble iron salt solution is preferably adjusted with sodium hydroxide. The pH value of the soluble iron salt solution is preferably 7.0.

In the present disclosure, the culture medium preferably includes 10 mL of vitamin solution, 10 mL of metal solution, 2.5 g of $NaHCO_3$, 0.53 g of $NaH_2PO_4$, 0.25 g of $NH_4Cl$, 0.1 g of KCl and 1 g of sodium acetate. In the present disclosure, the vitamin solution preferably includes 0.2 g/L biotin, 1 g/L vitamin B6, 0.5 g/L vitamin B1, 0.5 g/L pantothenic acid, 0.5 g/L para-aminobenzoic acid, 0.2 g/L folic acid, 0.5 g/L riboflavin, 0.5 g/L niacin, 0.01 g/L vitamin B12, and 0.5 g/L lipoic acid; the metal solution preferably includes 1.5 g/L nitrilotriacetic acid, 0.5 g/L $MnSO_4 \cdot H_2O$, 0.1 g/L $FeSO_4 \cdot 7H_2O$, 0.1 g/L $CoCl_2 \cdot 6H_2O$, 0.01 g/L $CuSO_4 \cdot 5H_2O$, 0.01 g/L $H_3BO_3$, 0.024 g/L $NiCl_2 \cdot 6H_2O$, 3 g/L $MgSO_4$, 1 g/L NaCl, 0.1 g/L $CaCl_2 \cdot 2H_2O$, 0.13 g/L $ZnCl_2$, 0.01 g/L $KAl(SO_4)_2 \cdot 12H_2O$, 0.025 g/L $Na_2MoO_4$ and 0.025 g/L $Na_2WO_4 \cdot 2H_2O$.

In the present disclosure, the time for introducing nitrogen is preferably 25-35 min, and more preferably 30 min; the rate of introducing nitrogen is preferably 80-150 mL/min, and more preferably 90-110 mL/min.

In the present disclosure, the dosage ratio of the soluble iron salt solution, the culture medium and the graphene is preferably 1 L:20 mL:(0.75-1.25) g, and more preferably 1 L:20 mL:(0.8-1.1) g.

In the present disclosure, the purchase channel of the *Geobacter sulfurreducens* is the American Type Culture Collection ATCC (*Geobacter sulfurreducens* PCA, ATCC 51573).

In a specific embodiment of the present disclosure, before adding the *Geobacter sulfurreducens*, the *Geobacter sulfurreducens* is preferably cultured in a laboratory; the specific process of the culture is preferably as follows: preparing a complete culture medium: 40 mol/L sodium fumarate (filtered and sterilized) is added to the basic medium (1.5 g/L $NH_4Cl$, 0.6 g/L $NaH_2PO_4$, 0.1 g/L KCl, 2.5 g/L $NaHCO_3$, 0.82 g/L sodium acetate) provided by ATCC as an electron acceptor, the metal solution described in the above technical scheme (including 1.5 g/L nitrilotriacetic acid, 0.5 g/L $MnSO_4 \cdot H_2O$, 0.1 g/L $FeSO_4 \cdot 7H_2O$, 0.1 g/L $COCl_2 \cdot 6H_2O$, 0.01 g/L $CuSO_4 \cdot 5H_2O$, 0.01 g/L $H_3BO_3$, 0.024 g/L $NiCl_2 \cdot 6H_2O$, 3 g/L $MgSO_4$, 1 g/L NaCl, 0.1 g/L $CaCl_2 \cdot 2H_2O$, 0.13 g/L $ZnCl_2$, 0.01 g/L $KAl(SO_4)_2 \cdot 12H_2O$, 0.025 g/L $Na_2MoO_4$ and 0.025 g/L $Na_2WO_4 \cdot 2H_2O$) and the vitamin solution described in the above technical scheme (including 0.2 g/L biotin, 1 g/L vitamin B6, 0.5 g/L vitamin B1, 0.5 g/L pantothenic acid, 0.5 g/L para-aminobenzoic acid, 0.2 g/L folic acid, 0.5 g/L riboflavin, 0.5 g/L niacin, 0.01 g/L vitamin B12, and 0.5 g/L lipoic acid) are added to prepare the complete culture medium. The pH value of the complete culture medium is adjusted to 7.0, 70 mL of the culture medium solution is added into a 100 mL of anaerobic bottle, nitrogen gas is introduced at a flow rate of 100 mL/min for 40 min to remove the dissolved oxygen in the culture medium, after sealing with a butyl rubber stopper and an aluminum cap, it is sterilized in a high-temperature steam sterilizer at 121° C. for 20 min. After the culture medium is cooled to room temperature, 5 mL of bacterial solution is inoculated into an anaerobic bottle by a disposable sterile syringe. The inoculation process is carried out in a sterile anaerobic operation box. After the inoculation is completed, it is placed in a constant temperature incubator at 30° C. When the bacteria grow to the logarithmic growth phase, the resulting system are transferred to a new culture medium.

In the present disclosure, the OD600 of the reduction reaction solution obtained after adding the *Geobacter sulfurreducens* is preferably 0.15-0.25, and more preferably 0.18-0.22.

In the present disclosure, the temperature of the reduction reaction of the soluble iron salt is preferably 30-35° C., more preferably 31-34° C., and most preferably 32-33° C.; the time is preferably 7-10 days, and more preferably 8-9 days.

After the reduction reaction of the soluble iron salt is completed, the present disclosure also includes centrifugation; the rotation speed of the centrifugation is preferably 10000-12000 rpm, more preferably 10500-11500 rpm, and most preferably 11000 rpm; the time is preferably 10-15 min, and more preferably 12-13 min.

After the graphene-magnetite-*Geobacter sulfurreducens* is obtained, the present disclosure mixes the graphene-magnetite-*Geobacter sulfurreducens* with the Nafion, and then coats the obtained suspension on the surface of the graphite rod electrode to obtain the graphene-magnetite conductive skeleton electrode.

In the present disclosure, the mass concentration of the Nafion is preferably 0.3-1.0%, and more preferably 0.4-0.6%.

In the present disclosure, the ratio of the mass of the graphene-magnetite-*Geobacter sulfurreducens* to the volume of the Nafion is preferably (1-5) g:(100-200) mL, and more preferably (2-3)) g:(120-160) mL.

In the present disclosure, the mixing is preferably carried out under ultrasonic conditions, and the ultrasonic time is preferably 20-30 min, and more preferably 23-26 min: The present disclosure does not have any special limitations on the speed of the ultrasound, and a speed well known to those skilled in the art and can ensure that a uniform suspension can be obtained within the above ultrasonic time can be used.

The present disclosure does not have any special limitations on the coating process, and a process well known to those skilled in the art can be used.

In the present disclosure, the coating amount of the suspension on the surface of the graphite rod electrode is preferably 2-8 $mg/cm^2$, and more preferably 4-6 $mg/cm^2$.

After the coating is completed, the present disclosure also preferably includes drying. In the present disclosure, the drying temperature is preferably 25-30° C., and more preferably 26-28° C.; the present disclosure does not have any special limitations on the drying time, and a time well known to those skilled in the art and can ensure that the obtained graphene-magnetite conductive skeleton electrode is completely dry can be used.

The present disclosure also provides a graphene-magnetite conductive skeleton electrode prepared by the preparation method described in the above technical scheme, including a graphite rod electrode and a modified layer coated on the surface of the graphite rod electrode;

The modified layer includes graphene, magnetite, and *Geobacter sulfurreducens*.

In the present disclosure, the thickness of the modified layer is preferably 0.5-1.2 nm, and more preferably 0.8-1.0 nm.

The present disclosure also provides the application of the graphene-magnetite conductive skeleton electrode described in the above technical scheme in the treatment of petrochemical wastewater.

The present disclosure also provides a method for treating petrochemical wastewater using the graphene-magnetite conductive skeleton electrode described in the above technical scheme, comprising the following steps:

Subjecting a three-electrode system to enrichment culture of a degradable microbial membrane in a mixed solution of a suspension containing electroactive microorganisms and a phosphate buffer to obtain the degradable microbial membrane on the surface of a graphene-magnetite conductive skeleton electrode; the mixed solution of the suspension containing electroactive microorganisms and the phosphate buffer also includes a carbon source; the three-electrode system uses the graphene-magnetite conductive skeleton electrode described in the above technical scheme as a working electrode, a platinum sheet as a counter electrode, and Ag/AgCl as a reference electrode;

According to the above method, replacing the mixed solution of the suspension containing the electroactive microorganisms and the phosphate buffer with the petrochemical wastewater to be treated, and performing degradation to obtain the degraded petrochemical wastewater.

In the present disclosure, the three-electrode system is subjected to enrichment culture of the degradable microbial membrane in a mixed solution of a suspension containing electroactive microorganisms and a phosphate buffer to obtain the degradable microbial membrane on the surface of a graphene-magnetite conductive skeleton electrode.

In the present disclosure, the OD600 of the suspension containing electroactive microorganisms is 0.1-0.3; in the present disclosure, the pH value of the phosphate buffer is preferably 6.7-7.3, and more preferably 6.9-7.1. In the present disclosure, the volume ratio of the petrochemical wastewater to the phosphate buffer is preferably (1-2):1, and more preferably (1.2-1.6):1.

In the present disclosure, the three-electrode system uses the graphene-magnetite conductive skeleton electrode described in the above technical scheme as a working electrode, a platinum sheet as a counter electrode, and Ag/AgCl as a reference electrode.

In the present disclosure, the mixed solution of the suspension containing the electroactive microorganisms and the phosphate buffer also includes a carbon source; the carbon source is preferably sodium acetate; the concentration of the carbon source in the mixed solution of the suspension containing the electroactive microorganisms and the phosphate buffer is preferably 1 g/L.

In the present disclosure, the conditions for the enrichment culture of the degradable microbial membrane are preferably as follows: culturing in a constant temperature box at 30° C. and protecting from light.

In the present disclosure, the enrichment culture time of the degradable microbial membrane is preferably 10-15 days, and more preferably 12-13 days.

In the present disclosure, the thickness of the degradable microbial membrane is preferably 70-100 μm, and more preferably 80-90 μm.

After the degradable microbial membrane is obtained on the surface of the graphene-magnetite conductive skeleton electrode, the present disclosure replaces the petrochemical wastewater and the phosphate buffer with the petrochemical wastewater to be treated according to the above method, and performs degradation to obtain the treated petrochemical wastewater; The petrochemical wastewater and the petrochemical wastewater to be treated are the same; or the petrochemical wastewater and the petrochemical wastewater to be treated are different.

In the present disclosure, the conditions of the degradation are preferably light-protected degradation in a thermostat at 30° C.

The graphene-magnetite conductive skeleton electrode provided by the present disclosure, a preparation method and application thereof, and the method for treating petrochemical wastewater will be described in detail below in conjunction with examples, but they should not be understood as limiting the protection scope of the present disclosure.

Example 1

100 mL of deionized water, 1.3 mL of concentrated sulfuric acid with a mass concentration of 98% and 1.0 mL of KOH solution with a mass concentration of 30% were mixed to obtain an electrolyte;

In an electrochemical reactor with a diameter of 5 cm and a height of 5 cm, the graphite sheet was used as the working electrode, and the platinum sheet was used as the counter electrode. The electrolysis was carried out in the electrolyte, the electrolysis process was as follows: after applying a voltage of +2.5 V for 3 min, a voltage of +10 V for 10 min, a voltage of −10 V for 5 min, and a voltage of +10 V for 15 min in sequence, the resulting system was centrifuged at 10000 rpm for 15 min, the centrifuged precipitate was washed by deionized water for 5 times and dried to obtain the graphene;

The pH value of 1 L of ferric chloride solution with a concentration of 50 mmol/L was adjusted to 7.0 by NaOH to obtain a ferric chloride solution with a pH value of 6.0;

5 mL of the vitamin solution (including 0.2 g/L biotin, 1 g/L vitamin B6, 0.5 g/L vitamin B1, 0.5 g/L pantothenic acid, 0.5 g/L para-aminobenzoic acid, 0.2 g/L folic acid, 0.5 g/L riboflavin, 0.5 g/L niacin, 0.01 g/L vitamin B12 and 0.5 g/L lipoic acid), 12.5 mL of the metal solution (including 1.5 g/L nitrilotriacetic acid, 0.5 g/L $MnSO_4 \cdot H_2O$, 0.1 g/L $FeSO_4 \cdot 7H_2O$, 0.1 g/L $CoCl_2 \cdot 6H_2O$, 0.01 g/L $CuSO_4 \cdot 5H_2O$, 0.01 g/L $H_3BO_3$, 0.024 g/L $NiCl_2 \cdot 6H_2O$, 3 g/L $MgSO_4$, 1 g/L NaCl, 0.1 g/L $CaCl_2 \cdot 2H_2O$, 0.13 g/L $ZnCl_2$, 0.01 g/L $KAl(SO_4)_2 \cdot 12H_2O$, 0.025 g/L $Na_2MoO_4$ and 0.025 g/L $Na_2WO_4 \cdot 2H_2O$), 2.5 g of $NaHCO_3$, 0.53 g of $NaH_2PO_4$, 0.25 g of $NH_4Cl$, 0.1 g of KCl and 1 g of sodium acetate were mixed to obtain a culture medium;

1 L of the ferric chloride solution with a pH value of 7.0, 20 mL of the culture medium and 1 g of graphene were mixed. After nitrogen was introduced at a rate of 100 mL/min for 30 min, the *Geobacter sulfurreducens* (PCA) solution was added to make the OD600 in the final system of 0.2, the resulting system was reacted for 10 days at 30° C., and centrifuged at 10000 rpm for 15 min to obtain the graphene-magnetite-*Geobacter sulfurreducens*;

2.4 g of the graphene-magnetite-*Geobacter sulfurreducens* and 150 mL of the Nafion with a mass concentration of 0.5% were mixed, subjected to ultrasonic treatment for 30 min to form a uniform suspension, the obtained suspension was coated on the surface of the graphite rod electrode with the coating amount of 5 mg/cm², and dried at a temperature of 25° C. to obtain the graphene-magnetite conductive skeleton electrode.

The test process of wastewater treatment:

A three-electrode system composed of the graphene-magnetite conductive skeleton electrode as the working electrode, the platinum sheet as the counter electrode, and Ag/AgCl as the reference electrode was subjected to the enrichment culture of degradable microbial membrane (cultivation in a thermostat at 30° C., protected from light) for 11.5 days in the mixed solution of the suspension containing electroactive microorganisms (OD600=0.2) and the phosphate buffer (pH=7) with a volume ratio of 2:1 (also including sodium acetate with a concentration of 1 g/L), and a degradable microbial membrane (thickness of 70-100 μm) was obtained on the surface of the graphene-magnetite conductive skeleton electrode;

According to the above method, the petrochemical wastewater and phosphate buffer were replaced with artificial petrochemical wastewater prepared in the laboratory (200 mg/L total petroleum hydrocarbons, 1 g/L sodium acetate, 12.5 mL/L metal solution (1.5 g/L nitrilotriacetic acid, 0.5 g/L $MnSO_4 \cdot H_2O$, 0.1 g/L $FeSO_4 \cdot 7H_2O$, 0.1 g/L $CoCl_2 \cdot 6H_2O$, 0.01 g/L $CuSO_4 \cdot 5H_2O$, 0.01 g/L $H_3BO_3$, 0.024 g/L $NiCl_2 \cdot 6H_2O$, 3 g/L $MgSO_4$, 1 g/L NaCl, 0.1 g/L $CaCl_2 \cdot 2H_2O$, 0.13 g/L $ZnCl_2$, 0.01 g/L $KAl(SO_4)_2 \cdot 12H_2O$, 0.025 g/L $Na_2MoO_4$ and 0.025 g/L $Na_2WO_4 \cdot 2H_2O$) and 5 mL/L vitamins solution (0.2 g/L biotin, 1 g/L vitamin B6, 0.5 g/L vitamin B1, 0.5 g/L pantothenic acid, 0.5 g/L para-aminobenzoic acid, 0.2 g/L folic acid, 0.5 g/L riboflavin, 0.5 g/L niacin, 0.01 g/L vitamin B12 and 0.5 g/L lipoic acid)) for degradation (degradation in a thermostat at 30° C., protected from light);

During the degradation process, samples were taken at different time points (6 h, 12 h, 24 h, 36 h, 48 h, 60 h, 72 h, 84 h, 96 h and 108 h). After the selected samples were centrifuged at 10000 rpm for 8 min, the supernatant was passed through a 0.45 μm filter membrane to remove impurities. After extraction, the sample was tested by gas chromatography, and the concentration of petroleum hydrocarbons in the petrochemical wastewater to be treated was calculated.

Examples 2-6

The preparation process is referred to Example 1, with the difference only in the condition parameters shown in Table 2

TABLE 2

Process parameters of Examples 2-6

| condition parameters | Example 2 | Example 3 | Example 4 | Example 5 | Example 6 |
|---|---|---|---|---|---|
| mass concentration of concentrated sulfuric acid | 1.0% | 1.1 % | 1.2 % | 1.4% | 1.5 % |
| KOH solution | 0.5 mL | 0.7 mL | 0.9 mL | 1.1 mL | 1.3 mL |
| mass concentration of Nafion | 0.3 % | 0.4 % | 0.6 % | 0.8 % | 1.0% |
| applying time of +2.5 V | 1 min | 2 min | 3 min | 3 min | 3 min |
| applying time of +10 V (the first time) | 5 min | 6 min | 7 min | 8 min | 9 min |
| applying time of −10 V | 3 min | 4 min | 4 min | 3 min | 4 min |
| applying time of +10 V (the second time) | 12 min | 13 min | 14 min | 13 min | 14 min |
| washing times | 3 | 4 | 4 | 3 | 4 |

Comparative Example 1

With reference to the process of Example 1, the difference was only that the preparation and addition of graphene were omitted.

Comparative Example 2

With reference to the process of Example 1, the difference was only that the preparation and addition of magnetite were omitted.

Comparative Example 3

The unmodified graphite rod was directly used as the working electrode to treat the wastewater, and the treatment process was referred to example 1.

Test Example

Figure 2:
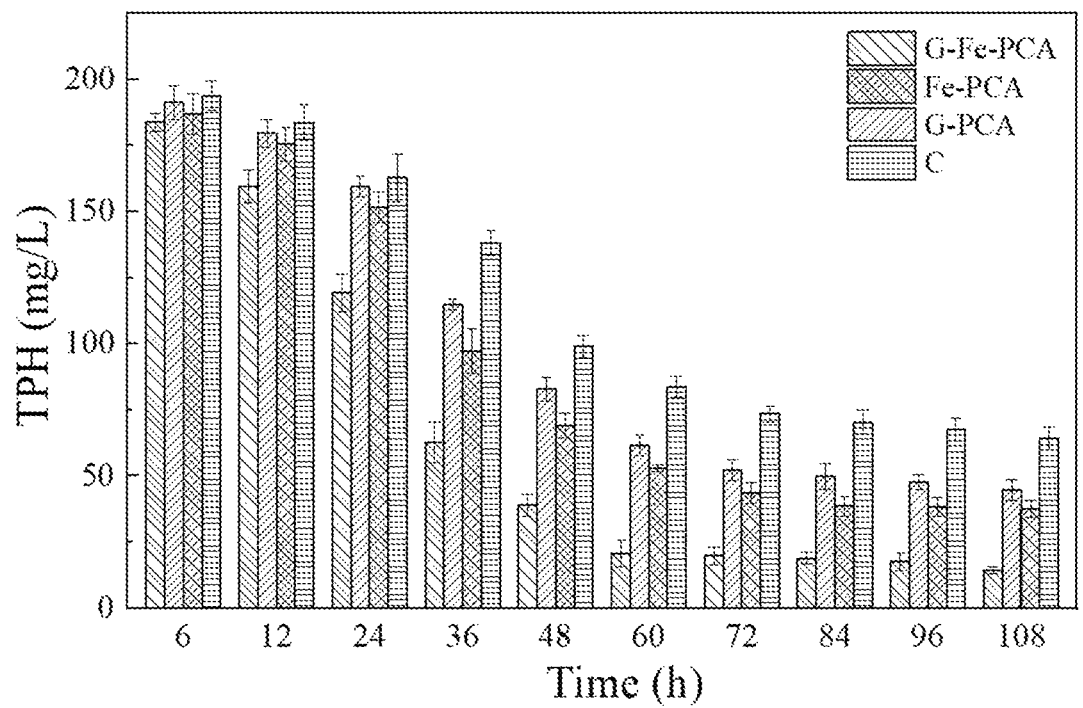
FIG. 2 shows the concentration change curve of total petroleum hydrocarbons of samples at different time points during the degradation process of Example 1 and Comparative Examples 1-3.
Figure 3:
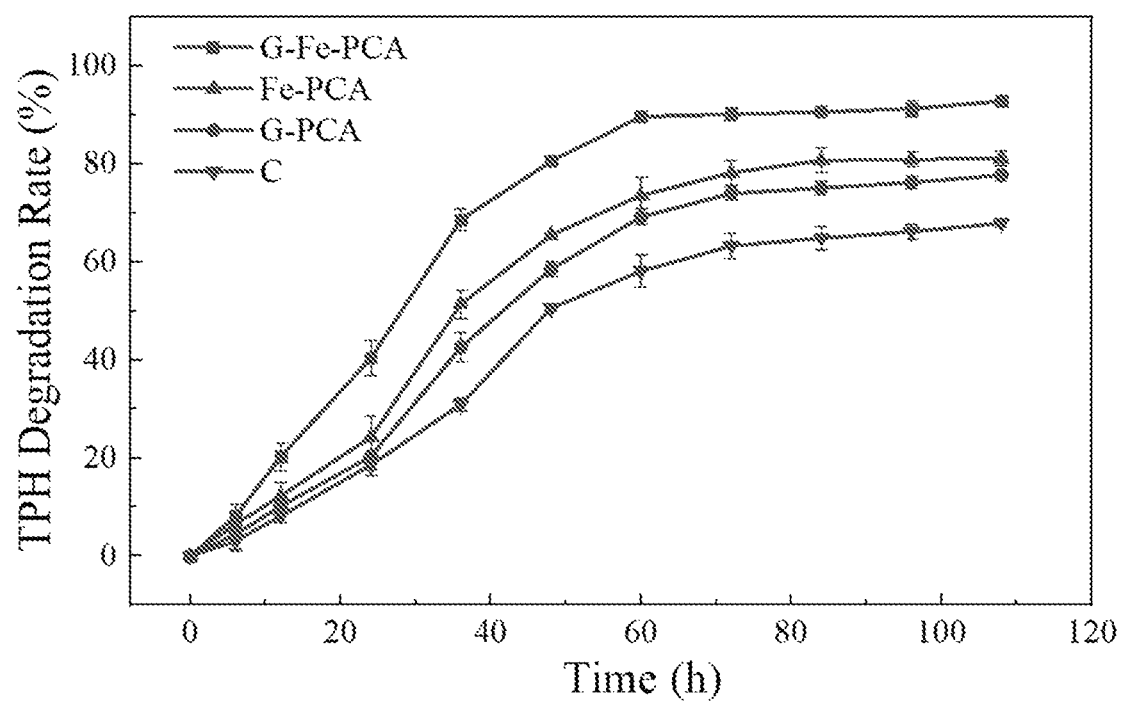
FIG. 3 shows the removal rate of total petroleum hydrocarbons of samples at different time points during the degradation process of Example 1 and Comparative Examples 1-3.

In the process of enrichment culture the degradable microbial membrane, an eight-channel potentiostat was used to collect the current generated in real time (recorded once every 100 s) to draw the curve, as shown in FIG. 1, where the group G-Fe-PCA is Example 1, the group Fe-PCA is Comparative Example 1, the group G-PCA is Comparative Example 2 and the group C is Comparative Example 3. It can be seen from FIG. 1 that before adding the petrochemical wastewater to be treated, Example 1 (group G-Fe-PCA) has the first peak current at 85 h, while the other three groups all reach the first peak current around 91 h, the highest current produced by Example 1 (group G-Fe-PCA) reaches 9.92 mA, which is 1.13 times that of group Fe-PCA (8.75 mA), 1.38 times that of group G-PCA (7.21 mA) and 1.58 times that of group C (6.29 mA). The current in the system is mainly generated by the metabolic activities and synergy between different microorganisms near the anode, and the electrons are exported to the electrode by the electricity-producing microorganisms; the shortening of the current generation time and the increase in electricity production have proved that the modification and construction of a conductive skeleton can increase the biomass of electroactive microorganisms on the electrode, and further improve the power generation capacity;

FIG. 2 shows the concentration change curve of total petroleum hydrocarbons of samples at different time points during the degradation process, wherein the group G-Fe-PCA is Example 1, the group Fe-PCA is Comparative Example 1, the group G-PCA is Comparative Example 2 and the group C is Comparative Example 3; FIG. 3 shows the removal rate of total petroleum hydrocarbons at different time points during the degradation process, wherein the group G-Fe-PCA is Example 1, the group Fe-PCA is Comparative Example 1, the group G-PCA is Comparative Example 2 and the group C is Comparative Example 3; It can be seen from FIG. 3 that after 108 h of restoration using the microbial electrochemical system containing graphene-magnetite conductive skeleton electrodes for the petrochemical wastewater, the removal amount of total petroleum hydrocarbons in the reactors of Example 1 and Comparative Example 1, Comparative Example 2 and Comparative Example 3 in descending order is group G-Fe-PCA>group Fe-PCA>group G-PCA>group C, indicating that the modification and construction of conductive skeleton improves the enrichment of electroactive microorganisms and degradable microorganisms on the electrodes in the microbial electrochemical system, further increases the biomass, enhances the electron transfer between the electrochemical microorganisms and the electrodes, and realizes the efficient treatment of typical petrochemical wastewater by the accelerated reactor, and the average removal rate of total petroleum hydrocarbons reaches 93%; Compared with other groups, the removal rate of TPH in the group G-Fe-PCA reaches more than 90% at 72 h, indicating that the removal of TPH in the solution has reached the optimal effect in the microbial electrochemical system using modified and constructed conductive skeleton electrodes. Compared with the group Fe-PCA and the group G-PCA, the PCA in the group G-Fe-PCA further converts the Fe-containing substances in the system into magnetite through its own metabolism on the dispersed graphene, which indicates that the efficient removal of TPH is the combined effect of these three substances.

The above are only the preferred embodiments of the present disclosure. It should be pointed out that for those of ordinary skill in the art, without departing from the principle of the present disclosure, several improvements and modifications can be made, and these improvements and modifications should also be regarded as the protection scope of the present disclosure.

What is claimed is:

1. A method for preparing a graphene-magnetite conductive skeleton electrode, wherein comprising the following steps;
    mixing a soluble iron salt solution with a pH value of 6.5-7.5, a culture medium, and graphene, introducing nitrogen, then adding the *Geobacter sulfurreducens* to perform a reduction reaction of the soluble iron salt and centrifuging to obtain graphene-magnetite-*Geobacter sulfurreducens*; and
    mixing the graphene-magnetite-*Geobacter sulfurreducens* and a Nafion, and then coating the resulting suspension on the surface of a graphite rod electrode to obtain the graphene-magnetite conductive skeleton electrode.

2. The method according to claim 1, wherein the preparation process of the graphene includes: using a graphite sheet as a working electrode and a platinum sheet as a counter electrode, and electrolyzing in an electrolyte to obtain the graphene,
    wherein the raw materials for preparing the electrolyte include 100 mL of water, 1.2-1.5 mL of concentrated sulfuric acid, and 0.5-1.5 mL of a KOH solution, and
    wherein the mass concentration of the concentrated sulfuric acid is 98%; and the mass concentration of the KOH solution is 30%.

3. The method according to claim 2, wherein the electrolysis process comprises applying a voltage of +2.5 V for 1-3 min, the voltage of +10 V for 5-10 min, the voltage of -10 V for 3-5 min, and the voltage of +10 V for 10-15 min using a DC power supply in sequence.

4. The method according to claim 1, wherein the concentration of the soluble iron salt in the soluble iron salt solution is 20-100 mmol/L.

5. The method according to claim 4, wherein the dosage ratio of the soluble iron salt solution, culture medium and graphene is 1 L: 20 mL: (0.75-1.25) g.

6. The method according to claim 1, wherein the culture medium includes 10 mL of a vitamin solution, 10 mL of a metal solution, 2.5 g of NaHCO3, 0.53 g of NaH2PO4, 0.25 g of NH4Cl, 0.1 g of KCl and 1 g of sodium acetate,
    wherein the vitamin solution includes 0.2 g/L biotin, 1 g/L vitamin B6, 0.5 g/L vitamin B1, 0.5 g/L pantothenic acid, 0.5 g/L para-aminobenzoic acid, 0.2 g/L folic acid, 0.5 g/L riboflavin, 0.5 g/L niacin, 0.01 g/L vitamin B12 and 0.5 g/L lipoic acid, and
    wherein the metal solution includes 1.5 g/L nitrilotriacetic acid, 0.5 g/L $MnSO_4 \cdot H_2O$, 0.1 g/L $FeSO_4 \cdot 7H_2O$, 0.1 g/L $CoCl_2 \cdot 6H_2O$, 0.01 g/L $CuSO_4 \cdot 5H_2O$, 0.01 g/L $H_3BO_3$, 0.024 g/L $NiCl_2 \cdot 6H_2O$, 3 g/L $MgSO_4$, 1 g/L NaCl, 0.1 g/L $CaCl_2 \cdot 2H_2O$, 0.13 g/L $ZnCl_2$, 0.01 g/L $KAl(SO_4)_2 \cdot 12 H_2O$, 0.025 g/L $Na_2MoO_4$ and 0.025 g/L $Na_2WO_4 \cdot 2H_2O$.

7. The method according to claim 6, wherein the dosage ratio of the soluble iron salt solution, culture medium and graphene is 1 L: 20 mL: (0.75-1.25) g.

8. The method according to claim 1, wherein the dosage ratio of the soluble iron salt solution, culture medium and graphene is 1 L: 20 mL: (0.75-1.25) g.

9. The method according to claim 1, wherein the OD600 of the reduction reaction solution obtained after adding the *Geobacter sulfurreducens* is 0.15-0.25.

* * * * *